United States Patent
Ohta et al.

(10) Patent No.: US 6,933,031 B2
(45) Date of Patent: Aug. 23, 2005

(54) OPTICAL INFORMATION RECORDING MEDIUM AND ITS MANUFACTURING METHOD

(75) Inventors: Hiroyuki Ohta, Shijonawate (JP); Ken'ichi Nagata, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/492,868

(22) PCT Filed: Oct. 18, 2002

(86) PCT No.: PCT/JP02/10821

§ 371 (c)(1),
(2), (4) Date: Apr. 16, 2004

(87) PCT Pub. No.: WO03/036632

PCT Pub. Date: May 1, 2003

(65) Prior Publication Data

US 2004/0252627 A1 Dec. 16, 2004

(30) Foreign Application Priority Data

Oct. 19, 2001 (JP) ............................. 2001-321653

(51) Int. Cl.$^7$ ................................ B32B 3/02
(52) U.S. Cl. ................. 428/64.1; 428/64.4; 428/64.5; 428/64.6; 430/270.13
(58) Field of Search ............... 428/64.1, 64.4, 428/64.5, 64.6, 913; 430/270.13, 495.1, 945

(56) References Cited

U.S. PATENT DOCUMENTS

| | | | |
|---|---|---|---|
| 5,194,363 A | | 3/1993 | Yoshioka et al. |
| 5,418,030 A | | 5/1995 | Tominaga et al. |
| 5,498,507 A | * | 3/1996 | Handa et al. ............ 430/273.1 |
| 5,631,895 A | * | 5/1997 | Okada et al. ............ 369/275.1 |
| 6,117,511 A | * | 9/2000 | Okada et al. ............... 428/64.1 |
| 6,146,733 A | | 11/2000 | Inoue et al. |
| 6,149,999 A | * | 11/2000 | Suzuki et al. ............... 428/64.1 |
| 6,503,690 B1 | | 1/2003 | Uno et al. |
| 6,649,241 B2 | * | 11/2003 | Ohkubo ..................... 428/64.1 |
| 6,775,226 B1 | * | 8/2004 | Miyamoto et al. ........ 369/275.1 |
| 6,821,707 B2 | * | 11/2004 | Uno et al. ............. 430/270.13 |
| 2002/0187424 A1 | * | 12/2002 | Nagata et al. ......... 430/270.13 |

FOREIGN PATENT DOCUMENTS

| | | |
|---|---|---|
| JP | 10-49914 | 2/1998 |
| JP | 11-167745 | 6/1999 |
| JP | 11-283277 | 10/1999 |
| JP | 11-306597 | 11/1999 |
| JP | 2001-209972 | 8/2001 |

* cited by examiner

*Primary Examiner*—Elizabeth Mulvaney
(74) *Attorney, Agent, or Firm*—Hamre, Schumann, Mueller & Larson, P.C.

(57) ABSTRACT

An optical information recording medium of the present invention includes a protective layer; an interface layer; and a recording layer, the optical characteristics of which are changed reversibly when irradiated by a laser beam, layered in this order on a substrate. The protective layer contains at least Zn, S, and Si atoms, and an atomic composition ratio of O to Si is at least 0 and smaller than 2. A refractive index of the interface layer is smaller than a refractive index of the protective layer.

13 Claims, 3 Drawing Sheets

US 6,933,031 B2

OPTICAL INFORMATION RECORDING MEDIUM AND ITS MANUFACTURING METHOD

TECHNICAL FIELD

The present invention relates to an optical information recording medium that is capable of recording information with high density and high speed by using optical means, and to a manufacturing method thereof.

BACKGROUND ART

Optical information recording media such as a magneto-optical recording medium and a phase-change recording medium are known for making it possible to record large amounts of data, and making it possible to reproduce and rewrite data at high-speeds. To record data, these optical information recording media take advantage of the differences in the optical characteristics of recording materials caused by localized irradiation by a laser beam. For example, a magneto-optical recording medium records data by taking advantage of the differences in the rotational angle of the plane of polarization of the reflected light that result from different states of magnetization. Also, a phase-change recording medium records data by taking advantage of the fact that the amount of light reflected when a laser of a predetermined wavelength is irradiated onto a material in a crystallized state and an amorphous state is different. And, because it is possible to erase records and rewrite records simultaneously by modulating the output power of the laser beam, the phase-change recording medium has the advantage that data signals can be rewritten at high speed.

Examples of the structure of phase-change recording medium are shown in FIGS. 3A and 3B. The recording medium shown in FIG. 3A is structured with a substrate 21, a first protective layer 22, a recording layer 23, and a second protective layer 24 layered in that order from the side on which the laser beam is irradiated.

Polycarbonate, polymethyl methacrylate (hereafter, PMMA) or other such resins, or glass or the like, is used for the substrate 21, and a guiding groove is generally provided to guide the laser beam.

The recording layer 23 is made from materials that exhibit reversible changes between states with different optical characteristics. In the case of rewritable-type phase-change recording medium, known examples of these include: Te—Sb—Ge, Te—Sn—Ge, Te—Sb—Sn—Ge, Te—Sb—Ge—Se, Te—Sn—Ge—Au, Ag—In—Sb—Te, In—Sb—Se, and In—Te—Se.

Materials for the first and second protective layers 22 and 24 include: a sulfide such as ZnS; an oxide such as $SiO_2$, $Ir_2O_5$, or $A_2O_3$; a nitride such as GeN, $Si_3N_4$, or $Al_3N_4$; or an oxynitride such as GeON, SiON, or AlON; a dielectric such as a carbide or a fluoride; or an appropriate mixture of materials such as these. However, the materials that are mainly used are mixtures of ZnS and $SiO_2$.

Furthermore, a phase-change recording medium is shown in FIG. 3B in which a reflective layer 25 is further provided. The reflective layer 25 is ordinarily made of a metal such as Au, Al, Ag, or Cr, or of an alloy including at least one of Au, Al, Ag and Cr as the primary metal. The reflective layer 25 is provided for purposes such as effective heat dissipation and light absorption of the recording layer 23.

There are three major reasons for the above-described structure in which the recording layer 23 is positioned between the two protective layers 22 and 24, or between the protective layer 22 and the protective layer 24 with the reflective layer 25. The first reason is that the recording layer 23 is made amorphous by melting and quenching when recording, so this structure is provided to maintain the form of the recording layer 23 and prevent mechanical deformation. The second reason is that, by raising the laser absorption efficiency of the recording layer 23, the change of the reflectance between the amorphous state and the crystallized state can be made larger, thus providing the optical effect that the amount of reproduction signals can be increased. The third reason is in order to control the thermal conditions necessary for making the recording layer 23 amorphous and crystallized. In particular, a known structure (quenching structure) for obtaining the necessary quenching conditions for making the material amorphous is one in which the protective layer 24 is made thin so that the heat of the recording layer 23 easily can escape through to the reflective layer 25.

Furthermore, although omitted from the drawings, structures are generally used in which an overcoat layer is provided over the second protective layer 24 or in which a dummy substrate is laminated using a UV-curing resin as an adhesive for the purpose of preventing oxidation and adherence of dust or the like on the recording medium.

Among various methods for forming each of the layers in a phase-change recording medium such as these, the method generally used is the so-called single-wafer film formation method in which independent film formation chambers are used successively to form each layer made of different materials.

Because the first protective layer 22 is designed to have the same or a greater thickness compared to the other layers, it requires more time for film formation than the other layers. Consequently, in the production processes of the phase-change recording medium, the film formation process for the thick film of the first protective layer 22 limits the overall production speed. Thus an issue for improving productivity is how to reduce the film formation time of the first protective layer 22.

Increasing the rate of film formation by way of the film formation conditions is a conceivable method for reducing the film formation time. For example, in the case of using a sputtering film formation device for film formation, possible methods include increasing the sputter power or reducing the distance between the target and the substrate to improve adherence efficiency, as well as increasing the diameter of the target. However, because there are large temperature rises on the film adhering surface of the sample with these methods, heat-caused deformation, that is, tilt change, can occur when the substrate is made of resins such as polycarbonate. These method are therefore not preferable. For example, the glass transition temperature of polycarbonate is 150° C., and because it is necessary that the substrate temperature not be raised above the glass transition temperature in order to prevent deformation, it is difficult to use such methods.

DISCLOSURE OF INVENTION

The optical information recording medium of the present invention includes a protective layer; an interface layer; and a recording layer, the optical characteristics of which are changed reversibly when irradiated by a laser beam, layered in this order on a substrate; wherein the protective layer contains at least Zn, S, and Si atoms, and an atomic composition ratio of O to Si ((atomic concentration of O)/(atomic concentration of Si) is at least 0 and smaller than 2; and wherein a refractive index of the interface layer is smaller than a refractive index of the protective layer.

The manufacturing method of an optical information recording medium of the present invention includes: a step of forming on a substrate a protective layer that contains atoms of Zn, S, and Si, and wherein the atomic composition ratio of O to Si is at least 0 and smaller than 2; a step of forming on the protective layer an interface layer with a refractive index that is smaller than that of the protective layer; and a step of forming on the interface layer a recording layer, an optical characteristic of which is changed reversibly when irradiated by a laser beam.

BEST MODE FOR CARRYING OUT THE INVENTION

Figure 1:
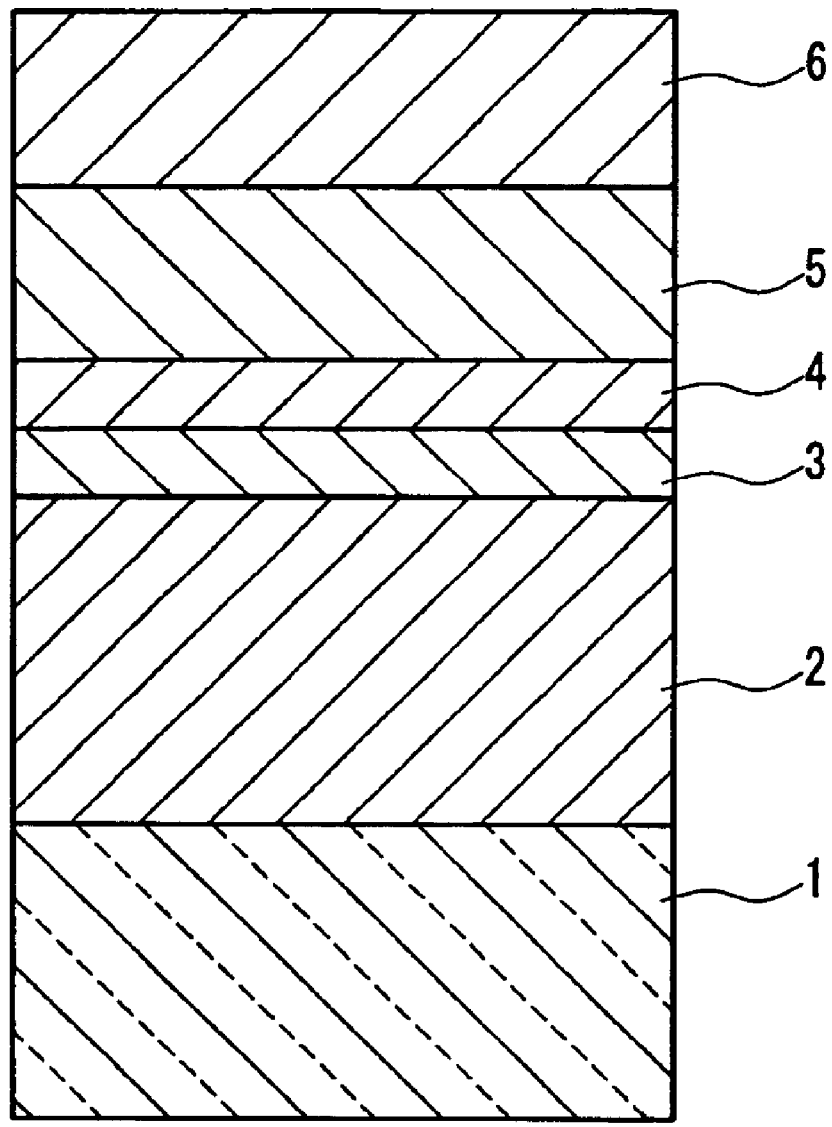
FIG. 1 is a cross-sectional view of the structure of an optical disk in one embodiment of an optical information recording medium of the present invention.

The optical information recording medium of the present invention is provided with a protective layer, an interface layer, and a recording layer, the optical characteristics of which are changed reversibly when irradiated by a laser beam, layered in this order on a substrate. The protective layer contains at least Zn, S, and Si atoms, and an atomic composition ratio of O to Si is at least 0 and smaller than 2, and the interface layer has a refractive index that is smaller than that of the protective layer. When a material such as this is used in the protective layer, the film formation rate of the protective layer is higher than that of a conventional optical information recording medium. Furthermore, as the material used in the protective layer of the present invention has a higher refractive index than that of a material generally used in a conventional protective layer, it is possible to achieve equivalent optical characteristics as the conventional protective layer even when the protective layer is made thinner than the conventional protective layer. The result of this is that the time required for forming a film as a protective layer for the optical information recording medium of the present invention can be made shorter than that of a conventional medium, and productivity can be improved. Also, the material of the protective layer used in the present invention is thermally, chemically, and mechanically stable, so this is preferable material for the protective layer of the optical information recording medium. Also, by providing between the recording layer and the protective layer an interface layer that has a smaller refractive index than that of the protective layer, it is possible to achieve equivalent or better optical characteristics and recording characteristics than the conventional optical information recording medium even when using a material different from a conventional material to form a protective layer as in the optical information recording medium of the present invention.

Furthermore, it is preferable that the protective layer has an atomic composition ratio of O to Si that is at least 0 and at most 1. Furthermore, it is preferable that the difference between the refractive indices of the interface layer and the recording layer is greater than 0.1. Furthermore, when the Si and O is represented by $SiO_x$ ($0 \leq x < 2$), the protective layer contains $SiO_x$ at least 3 mol % and at most 30 mol %, and is more preferable at at least 5 mol % and at most 30 mol %. This is so that more favorable recording characteristics can be obtained.

Furthermore, it is preferable that the interface layer contains at least one of the atoms of N and O, and that the total of N and O atoms is at least 10 at % and at most 40 at %. The recording characteristics are favorable when this total is at least 10 at %, and film separation between the interface layer and the protective layer tends not to occur when this total is at most 40 at %.

Furthermore, it is preferable that the thickness of the protective layer is at least 50 nm and at most 200 nm. This enables the amount of light that comes back (the reflected light) when the optical information recording medium is irradiated with a laser beam to be greater than approximately 15%.

Furthermore, it is preferable that the thickness of the interface layer is at least 2 nm and at most 30 nm. This is because this enables the amount of light that comes back (the reflected light) when the optical information recording medium is irradiated with a laser beam to be greater than approximately 15%.

Furthermore, a structure in which a reflective layer is provided on an opposite side of the recording layer with respect to a side irradiated by the laser beam is also possible. This enables effective light absorption and effective heat dissipation of the recording layer to be obtained.

Furthermore, it is preferable that the interface layer is made of a material that contains a nitride or an oxynitride of at least one of the elements Ge, Si, and C, or a material that contains simple-substance carbon. This maintains crystallization capabilities of the recording layer and enables stabilized record-erasing characteristics when using the protective layer of the present invention.

The manufacturing method of the optical information recording medium of the present invention includes the forming on a substrate of, first, a protective layer that contains at least Zn, S, and Si atoms, and in which the atomic composition ratio of O to Si is at least 0 and smaller than 2, then the forming on the protective layer of an interface layer that has a refractive index smaller than the protective layer, and next the forming on the interface layer of a recording layer whose optical characteristics are changed reversibly when irradiated with a laser beam. With this method, an optical information recording medium with favorable optical characteristics, recording characteristics, and the like can be manufactured with good productivity.

Furthermore, in the forming of the protective layer, it is preferable that the protective layer is formed containing Zn, S, and Si atoms, and that the atomic composition ratio of O to Si is at least 0 and at most 1. This enables the manufacture of an optical information recording medium with more favorable characteristics such as recording characteristics.

The following is a description of preferred embodiments of the present invention with reference to the accompanying drawings.

FIG. 1 shows the structure of a phase-change optical disk that is an optical information recording medium of the present invention. The phase-change optical disk of this embodiment is made of a substrate 1, a first protective layer 2, an interface layer 3, a recording layer 4, a second protective layer 5, and a reflective layer 6 layered in that order from the side on which a laser beam is irradiated.

Glass, resin or the like may be used as the substrate 1. Ordinarily, transparent glass, quartz, or resins such as polycarbonates, PMMA, or polyolefins are used.

A phase-change recording material is used for the recording layer 4. Phase-change recording materials that may be used are materials that produce an optically detectable change of state between an amorphous state and a crystallized state, or between a certain crystallized state and a further different crystallized state. Specific materials that may be used include an alloy of Te, Se, Sb, In, Sn, Ag, Ge, or the like, for example, a material that contains Te—Sb—Ge, Te—Sn—Ge, Te—Sb—Sn—Ge, Te—Sb—Ge—Se, Te—Sn—Ge—Au, Ag—In—Sb—Te, In—Sb—Se, or In—Te—Se.

The first protective layer 2 contains at least atoms of Zn, S, and Si. The first protective layer 2 may further include atoms of O. When the first protective layer 2 contains atoms of O, the atomic composition ratio of O to Si is less than 2.

Figure 2:
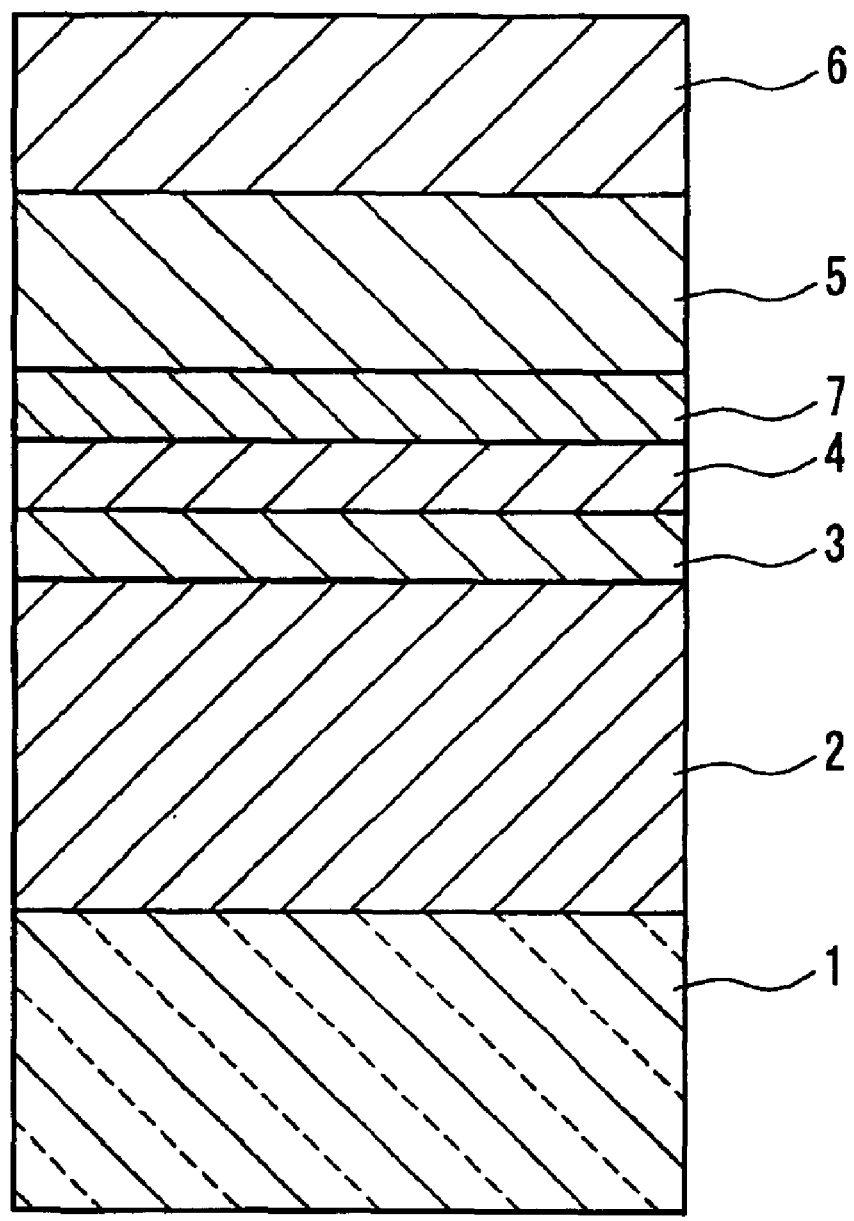
FIG. 2 is a cross-sectional view of the structure of an optical disk in another embodiment of an optical information recording medium of the present invention.
Figure 3A:
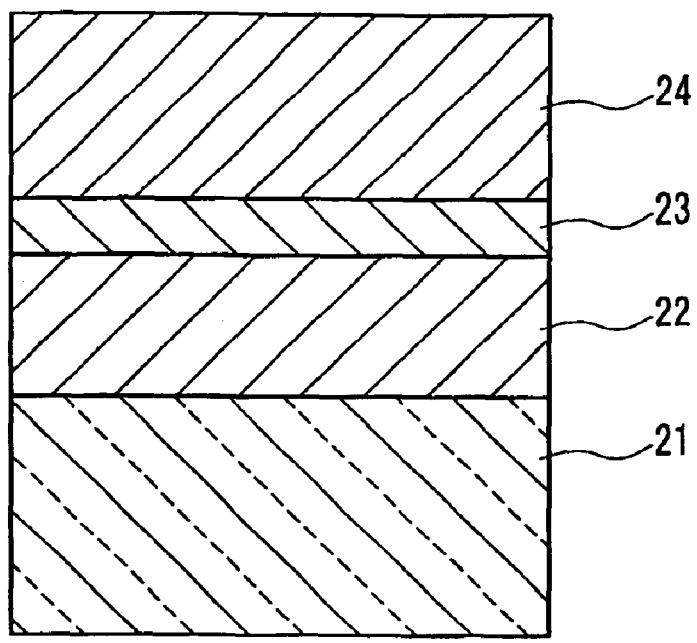
FIGS. 3A and 3B are cross-sectional views of the structures of conventional optical information recording media.
Figure 3B:
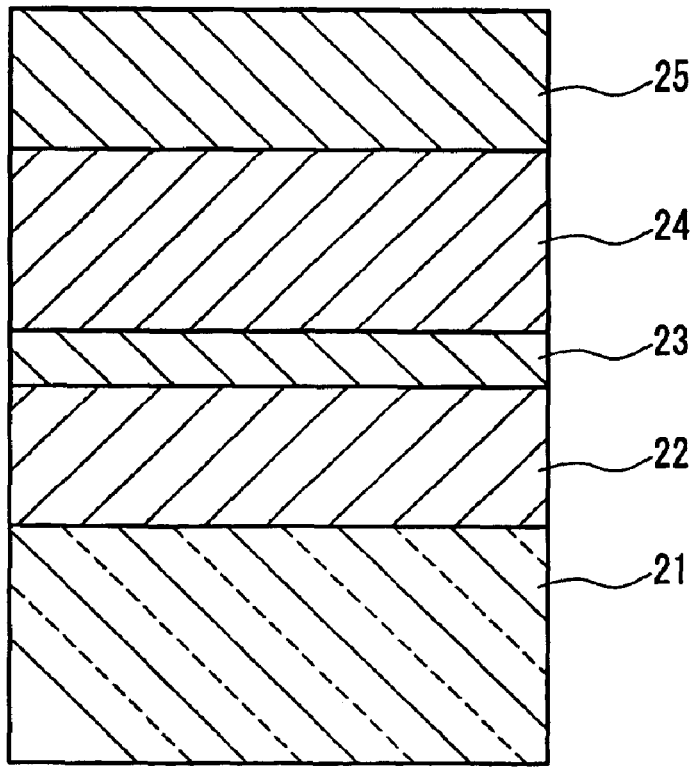

Furthermore, the interface layer 3 is made of a material that has a lower refractive index than that of the first protective layer 2, and made of a material for example that includes a nitride or an oxynitride of Ge, Si, or C, or a material that includes simple-substance carbon. By forming the interface layer 3 with such a material, the crystallization capabilities of the recording layer 4 can be maintained, and a stabilizing effect on the record-erasing characteristics can be obtained when using the first protective layer 2 of the present invention. It should be noted that, in the structure of this embodiment, only the surface on the laser-irradiated side of the recording layer 4 is provided with the interface layer 3. However, as shown in FIG. 2, a structure in which a second interface layer 7 is further provided on the surface that is opposite the laser-irradiated side of the recording layer 4 is also possible. For the second interface layer 7, a nitride or an oxynitride of at least one element of Ge, Si, Al, Cr, Zr, and Ta can be used, for example.

For the second protective layer 5, any mixture of ZnS with an oxide, a nitride, or an oxynitride of $SiO_2$, $Ta_2O_5$, $Si_3N_4$, SiNO, or the like; or an oxide, a nitride, or an oxynitride of Al, Ge, or Si; or at least one of the constituent elements of the recording layer 4 may be used, for example.

A metal such as Au, Al, Ag, and Cr, or an alloy whose principal component is a metal such as Au, Al, Ag, and Cr may be used in the reflective layer 6. It should be noted that a reflective layer 6 is provided in this embodiment, but a structure without a reflective layer 6 is also possible.

The following is a description of a method for manufacturing an optical disk of this embodiment. Available methods for manufacturing the multiple layered films that constitute this optical disk include sputtering methods, vacuum deposition methods, and CVD methods, but the description here will concern the use of sputtering methods.

First, using a target A containing predetermined proportions of Zn, S, and Si atoms, the first protective layer 2 made of a mixture containing Zn, S, and Si atoms is formed on the substrate 1 by applying a predetermined power while supplying a constant flow volume of Ar gas at a predetermined pressure. It should be noted that when the structure of the first protective layer 2 further includes O atoms, a target containing Zn, S, Si, and O at predetermined proportions should be prepared as the target A so that the atomic composition ratio of O to Si in the first protective layer 2 is less than 2 or preferably at most 1.

Next, using a target B containing at least one element of Ge, Si, and C, a predetermined power is applied while supplying a constant flow volume of a mixed gas at a predetermined pressure with predetermined proportions of $N_2$ and $O_2$ to Ar gas. In this way, the interface layer 3 is formed on the first protective layer 2. It should be noted that the composition of the target B and the sputtering conditions are selected appropriately so that the refractive index of the interface layer 3 is smaller than the refractive index of the first protective layer 2.

Further still, the recording layer 4, the second protective layer 5, and the reflective layer 6 are formed successively using targets of predetermined compositions.

With the above-described method, an optical disk can be manufactured in which the atomic composition ratio of O to Si in the first protective layer 2 is less than 2 or preferably at most 1, and the refractive index of the interface layer 3 is smaller than that of the first protective layer 2.

It should be noted that a sputtering method using Ar gas has been described here, but gases other than Ar gas may be used, such as Kr gas or other noble gases that can be used in sputtering.

When using a target containing predetermined proportions of Zn, S, Si, and O as a target A here, then the atomic concentration of O contained in the film that is formed tends not to vary in the period from the start to the completion of the use of the target when the target is manufactured with a mixture containing predetermined proportions of mixtures of ZnS, Si, and SiO, so a first protective layer 2 with a constant film quality can be formed.

WORKING EXAMPLES

The following is a description of optical information recording media of the present invention using specific examples. The atomic concentrations in each of the Working Examples and Comparative Examples were measured using Rutherford backscattering spectrometry.

(1) Working Examples 1 to 6 and Comparative Example 1

The optical information recording media used in the Working Examples 1 to 6 and Comparative Example 1 have the same structure as that shown in FIG. 1.

A substrate made of polycarbonate with a thickness of 600 μm was used as the substrate 1.

The interface layer 3 was formed using an oxynitride of Ge (Ge—N—O) and set to a thickness of 5 nm. More specifically, it was made by preparing a target made of Ge, and applying an RF power of 5.0 W/cm$^2$ to a cathode while supplying a constant flow volume of a mixture of 30% $N_2$ gas and 5% $O_2$ gas mixed with Ar gas so that the total pressure was 2.0 Pa. The N atomic concentration in the interface layer 3 manufactured in this way was 25 at %, and the 0 atomic concentration was 5 at %.

The recording layer 4 was formed using $Ge_6Sb_2Te_9$ and set to a thickness of 10 nm. More specifically, it was made by preparing a target made of $Ge_6Sb_2Te_9$, and applying a DC sputter power of 0.6 W/cm$^2$ to a cathode while supplying a constant flow volume of a mixture of 2.5% $N_2$ gas mixed with Ar gas so that the total pressure was 0.1 Pa.

The second protective layer 6 was made of a mixture of 80 mol % ZnS and 20 mol % $SiO_2$ and set to a thickness of 45 nm. More specifically, it was made by preparing a target containing predetermined proportions of ZnS and $SiO_2$, and applying an RF power of 10.5 W/cm$^2$ to a cathode while supplying a constant flow volume of a mixture of 2.5% $N_2$ gas mixed with Ar gas so that the total pressure was 0.2 Pa.

The reflective layer 6 was formed using Ag and set to a thickness of 100 nm. More specifically, it was made by preparing an Ag target, supplying Ar gas so that the total pressure was 0.4 Pa, and applying a DC power of 6.4 W/cm$^2$ to a cathode.

The first protective layer 2 included atoms of Zn, S, and Si, and was further manufactured so that the atomic composition ratio of O atoms to Si atoms was respectively 0 (Working Example 1), 0.3 (Working Example 2), 0.6 (Working Example 3), 0.9 (Working Example 4), 1 (Working Example 5), 1.5 (Working Example 6), and 2 (Comparative Example 1). It should be noted that the thickness of the first protective layer 2 was 140 nm in all the optical disks of Working Examples 1 to 6 and the Comparative Example 1. Furthermore, when the materials of the first protective layer 2 were expressed as (100-a) mol % ZnS-a mol % SiOx (x=0, 0.3, 0.6, 0.9, 1, 1.5), a became 20 (80 mol % ZnS-20 mol % SiOx), that is, the SiOx contained in the first protective layer 2 was made to become 20 mol %. More specifically, it was made by preparing a target containing ZnS, Si, and SiO at predetermined proportions, and applying an RF power of 10.5 W/cm² to a cathode while supplying Ar gas at a constant flow rate so that the total pressure was 0.2 Pa. It should be noted that the atomic composition ratio of O to Si in the formed first protective layers 2 was controlled to the respective set values of the Working Examples 1 to 6 and the Comparative Example 1 by changing the composition of the used target appropriately.

The recording characteristics of the optical disks of the Working Examples 1 to 6 and the Comparative Example 1 that were manufactured as described above were measured using an optical disk drive with a built-in optical pick-up with a linear velocity of 8 m/s, a laser wavelength of 660 nm, and an objective lens with a numerical aperture (NA) of 0.6, after the recording layer 4 was crystallized by continuous laser irradiation while being rotated at a linear velocity of 8 m/s by an initializing device that had an optical system with a laser wavelength of 780 nm, and a numerical aperture (NA) of 0.55. Using the EFM signal method with the shortest mark length T at 61 μm, measurements of the recording characteristics were carried out by alternately recording marks of the lengths 3T and 11T on the same track ten times, and measuring the CNR of the 3T mark. Furthermore, evaluations were carried out of the film formation rate of the first protective layer 2. The film formation rate evaluations were expressed as relative evaluations with the film formation rate of the first protective layer of the conventional optical disk of the Comparative Example 1 being taken as 100. Table 1 shows the atomic composition ratio of O to Si (O/Si), the film formation rate evaluation, and the CNR measured results of the optical characteristics for the Working Examples 1 to 6 and the Comparative Example 1 respectively.

TABLE 1

|  | O/Si | Film formation rate | CNR (dB) |
|---|---|---|---|
| Working Example 1 | 0 | 125 | 56 |
| Working Example 2 | 0.3 | 123 | 58 |
| Working Example 3 | 0.6 | 120 | 58 |
| Working Example 4 | 0.9 | 115 | 56 |
| Working Example 5 | 1 | 110 | 55 |
| Working Example 6 | 1.5 | 105 | 55 |
| Comparative Example 1 | 2 | 100 | 55 |

From the results it has been confirmed that when the atomic composition ratio of O to Si of the first protective layer 2 is less than 2, the film formation rate of the first protective layer 2 is higher than that of a conventional layer (Comparative Example 1).

Furthermore, the CNR showing the recording characteristics has been confirmed as being improved beyond that of conventional optical disks (Comparative Example 1) in the area in which the atomic composition ratio of O to Si is at most 1. Consequently, in order to have a film formation rate higher than the conventional rate, and also improve the CNR, it is preferable that the atomic composition ratio of O to Si of the first protective layer 2 is at most 1.

(2) Working Examples 7 to 14

The optical disks used in the Working Examples 7 to 14 were given the same structure as that shown in FIG. 1. Furthermore, the substrate 1, the interface layer 3, the recording layer 4, the second protective layer 5, and the reflective layer 6 were manufactured in the same way as the optical disks of the Working Examples 1 to 6.

The first protective layers 2 included atoms of Zn, S, and Si, and were formed with a material that did not include atoms of O (the atomic composition ratio of O to Si was 0), and were respectively made so that, when the materials of the first protective layer 2 were expressed as (100-a) mol % ZnS-a mol % Si, a became 0 (Working Example 7), 3 (Working Example 8), 5 (Working Example 9), 10 (Working Example 10), 20 (Working Example 11), 30 (Working Example 12), 40 (Working Example 13), and 50 (Working Example 14), that is, the layers were made so that the amount of Si contained would become equivalent to these values. Furthermore, the thicknesses were all set to 140 nm. More specifically, they were made by preparing a target containing ZnS and Si at predetermined proportions, and applying an RF power of 10.5 W/cm² to a cathode while supplying Ar gas at a constant flow rate so that the total pressure was 0.2 Pa. It should be noted that the amount of Si contained in the formed first protective layers 2 was controlled to the respective set values by changing the composition of the used target appropriately.

Measurements of the recording characteristics and film formation rate evaluations were carried out for the respective optical disks of the Working Examples 7 to 14 manufactured as described above with the same methods as those for the Working Examples 1 to 6. It should be noted that the optical disk of the Comparative Example 1 (an optical disk formed with a first protective layer 2 of 80 mol % ZnS-20 mol % SiO₂) was used as the conventional optical disk used in the film formation rate evaluations. Table 2 shows the amount of Si contained, the film formation rate evaluation, and the CNR measured result of the optical characteristics for the respective Working Examples 7 to 14.

TABLE 2

|  | Si content (mol %) | Film formation rate | CNR (dB) |
|---|---|---|---|
| Working Example 7 | 0 | 96 | 53 |
| Working Example 8 | 3 | 100 | 55 |
| Working Example 9 | 5 | 105 | 56 |
| Working Example 10 | 10 | 110 | 56 |
| Working Example 11 | 20 | 125 | 56 |
| Working Example 12 | 30 | 130 | 55 |
| Working Example 13 | 40 | 133 | 52 |
| Working Example 14 | 50 | 134 | 50 |
| Comparative Example 1 | — | 100 | 55 |

From the results it has been confirmed that when the amount of Si contained in the first protective layer 2 exceeds 3 mol %, the film formation rate is higher than that of a conventional layer (Comparative Example 1). It seems that this is because the overall film formation rate became higher by increasing the proportion of Si, which has a higher sputter rate than ZnS. However, because the CNR becomes lower than that of a conventional optical disk when the content of Si exceeds 30 mol %, it is preferable that the amount of Si contained is at most 30 mol % so that a CNR equivalent to or greater than that of a conventional optical disk can be maintained. Consequently it is preferable that the content of Si in the first protective layer 2 ranges between 3 and 30 mol %, and in order to further improve the CNR, it is preferable that it ranges between 5 and 30 mol %.

(3) Working Examples 15 to 28 and Comparative Examples 2 and 3

The optical disks used in the Working Examples 15 to 28 and Comparative Examples 2 and 3 were given the same structure as that shown in FIG. 1. Furthermore, the substrate 1, the recording layer 4, the second protective layer 5, and the reflective layer 6 were manufactured in the same way as the optical disks of the Working Examples 1 to 6.

The first protective layers 2 included atoms of Zn, S, and Si, were formed with a material that did not include atoms of O (the atomic composition ratio of O to Si was 0), and were made so that, when the materials of the first protective layer 2 were expressed as (100-a) mol % ZnS-a mol % Si, a became 30 (70 mol % ZnS-30 mol % Si), that is, the layers were made so that the amount of Si contained would become 30 mol %. Furthermore, the thicknesses were all set to 140 nm. More specifically, they were made by preparing a target containing ZnS and Si atoms at predetermined proportions, and applying an RF power of 10.5 W/cm$^2$ to a cathode while supplying Ar gas at a constant flow rate so that the total pressure was 0.2 Pa.

The interface layers 3 were made of a nitride, an oxide, or an oxynitride of Ge. More specifically, the interface layers 3 were formed using a target made of Ge, and manufactured with different atomic concentrations of N and O among the optical disks of Working Examples 15 to 29 by varying the proportions of $N_2$ gas and $O_2$ gas contained in the sputter gas. Furthermore, the Comparative Example 2 was an optical disk with an interface layer 3 that included neither N atoms nor O atoms, and the Comparative Example 3 was an optical disk with an interface layer 3 that included only O atoms at 5 at %. It should be noted that the gas pressure and the power applied during sputtering were the same as in the Working Examples 1 to 6.

Measurements of the differences in the refractive indices of the first protective layer 2 and the interface layer 3, evaluations of whether or not there was peeling between the first protective layer 2 and the interface layer 3, and measurements of the recording characteristics (CNR measurements) were carried out for the optical disks of the Working Examples 15 to 28 and the Comparative Examples 2 and 3 manufactured as described above. The refractive index measurements for 100 nm thick single layer film samples that were formed on quartz glass substrates respectively in the same condition with the first protective layer 2 or the interface layer 3 were carried out by using a spectroscopic ellipsometry measurement method. The evaluations of whether or not there was peeling were carried out by observations with an optical microscope after storing the samples for 300 hours in an atmosphere with a temperature of 90° C. and a relative humidity of 80%. The CNR measurements were carried out with the same method as for the Working Examples 1 to 6. The atomic concentration of N contained in the interface layer 3, the atomic concentration of O, the differences in the refractive indices of the first protective layer 2 and the interface layer 3, the CNR, and the results of the evaluations of whether or not there was peeling are shown in Table 3 for the Working Examples 15 to 28 and the Comparative Examples 2 and 3. It should be noted that, in Table 3, the difference in the refractive indices is indicated as "+" when the refractive index of the interface layer 3 was higher than that of the first protective layer 2, and "−" when it was lower. Furthermore, with regard to whether or not there was peeling, "X" indicates that peeling occurred, and "O" indicates that peeling did not occur.

TABLE 3

|  | N concentration (at %) | O concentration (at %) | Refractive index difference | CNR (dB) | Peeling |
|---|---|---|---|---|---|
| Working Example 15 | 10 | 0 | −0.1 | 55 | ○ |
| Working Example 16 | 20 | 0 | −0.3 | 56 | ○ |
| Working Example 17 | 30 | 0 | −0.5 | 56 | ○ |
| Working Example 18 | 40 | 0 | −0.8 | 56 | ○ |
| Working Example 19 | 50 | 0 | −0.8 | 55 | ○ |
| Working Example 20 | 0 | 10 | −0.2 | 56 | ○ |
| Working Example 21 | 0 | 20 | −0.4 | 56 | ○ |
| Working Example 22 | 0 | 30 | −0.6 | 56 | ○ |
| Working Example 23 | 0 | 40 | −0.8 | 56 | X |
| Working Example 24 | 0 | 50 | −0.8 | 55 | ○ |
| Working Example 25 | 5 | 5 | −0.5 | 55 | ○ |
| Working Example 26 | 20 | 5 | −0.3 | 56 | ○ |
| Working Example 27 | 30 | 5 | −0.8 | 56 | ○ |
| Working Example 28 | 40 | 5 | −0.8 | 56 | X |
| Comparative Example 2 | 0 | 0 | +0.2 | 53 | ○ |
| Comparative Example 3 | 0 | 5 | 0 | 54 | ○ |

In the optical disks of the Comparative Examples 2 and 3, the refractive index of the interface layer 3 was higher than the refractive index of the first protective layer 2, and it was confirmed that they had a lower CNR compared to optical disks in which the refractive index of the interface layer 3 was lower than the refractive index of the first protective layer 2 as in the Working Examples 15 to 28. That is, it was confirmed that, when the materials of the present invention were used to form the first protective layer 2 in order to raise the film formation rate, the recording characteristics could be made equal to or greater than those of conventional ordinary optical disks due to the refractive index of the interface layer 3 being lower than the refractive index of the first protective layer. Furthermore, it was confirmed that the refractive index of the interface layer 3 could be made lower than that of the first protective layer when the total of the atomic concentration of N and the atomic concentration of O contained in the interface layer 3 was set to 10 at % or higher. Furthermore, it was confirmed that it was difficult for peeling to occur between the interface layer 3 and the first protective layer 2 when the total of the atomic concentration of N and the atomic concentration of O was 40 at % or lower.

What is claimed is:

1. An optical information recording medium comprising,
    a protective layer; an interface layer; and a recording layer, the optical characteristics of which are changed reversibly when irradiated by a laser beam, layered in this order on a substrate;
    wherein the protective layer contains at least Zn, S, and Si atoms, and an atomic composition ratio of O to Si is at least 0 and smaller than 2;
    wherein a refractive index of the interface layer is smaller than a refractive index of the protective layer.

2. The optical information recording medium according to claim 1,
    wherein the atomic composition ratio of O to Si in the protective layer is at least 0 and at most 1.

3. The optical information recording medium according to claim 1,
    wherein a difference between the refractive indices of the interface layer and the recording layer is at least 0.1.

4. The optical information recording medium according to claim 1,
    wherein, when the Si and O is represented by SiOx ($0 \leq x < 2$), the protective layer contains SiOx in at least 3 mol % and at most 30 mol %.

5. The optical information recording medium according to claim 4,
    wherein the protective layer contains SiOx in at least 5 mol % and at most 30 mol %.

6. The optical information recording medium according to claim 1,
    wherein the interface layer comprises at least one of the atoms of N and O, and a total of N and O atoms is at least 10 at % and at most 40 at %.

7. The optical information recording medium according to claim 1,
    wherein a thickness of the protective layer is at least 50 nm and at most 200 nm.

8. The optical information recording medium according to claim 1,
    wherein a thickness of the interface layer is at least 2 nm and at most 30 nm.

9. The optical information recording medium according to claim 1, further comprising:
    a reflective layer arranged on an opposite side of the recording layer with respect to a side irradiated by the laser beam.

10. The optical information recording medium according to claim 1,
    wherein the interface layer contains a nitride or an oxynitride of at least one of the elements selected from Ge, Si, and C.

11. The optical information recording medium according to claim 1,
    wherein the interface layer is made of a simple-substance carbon.

12. A method for manufacturing an optical information recording medium, comprising:
    (a) a step of forming on a substrate a protective layer that contains atoms of Zn, S, and Si, and wherein the atomic composition ratio of O to Si is at least 0 and smaller than 2;
    (b) a step of forming on the protective layer an interface layer with a refractive index that is smaller than that of the protective layer; and
    (c) a step of forming on the interface layer a recording layer, an optical characteristic of which is changed reversibly when irradiated by a laser beam.

13. The method for manufacturing an optical information recording medium according to claim 12,
    wherein, in the step (a), a protective layer is formed that contains atoms of Zn, S, and Si, and wherein the atomic composition ratio of O to Si is at least 0 and at most 1.

* * * * *